United States Patent [19]

Brenner

[11] 4,378,936

[45] Apr. 5, 1983

[54] ENGINE MOUNTINGS FOR TRUCKS, MOTOR COACHES OR THE LIKE UTILITY VEHICLES

[75] Inventor: Heinz Brenner, Neuenahr-Ahrweiler, Fed. Rep. of Germany

[73] Assignee: BOGE GmbH, Eitort, Fed. Rep. of Germany

[21] Appl. No.: 264,098

[22] Filed: May 15, 1981

[30] Foreign Application Priority Data

Jun. 27, 1980 [DE] Fed. Rep. of Germany ....... 3024090

[51] Int. Cl.$^3$ .......................... F16F 1/36; F16F 13/00
[52] U.S. Cl. ................... 267/140.1; 248/562; 267/63 A; 267/140.2; 267/141.1; 267/141.7
[58] Field of Search ................ 188/379; 267/8 R, 35, 267/140.1, 141.2, 141.3, 141.4, 141, 63 A, 140.2, 141.1; 248/562, 632

[56] References Cited

U.S. PATENT DOCUMENTS

| | | | |
|---|---|---|---|
| 2,502,322 | 3/1950 | Iredell, Jr. .......................... | 267/140.1 |
| 3,658,314 | 4/1972 | Luzsicza ........................... | 267/35 X |
| 4,159,091 | 6/1979 | LeSalver et al. ................... | 248/562 |
| 4,288,063 | 9/1981 | Brenner et al. ............... | 267/140.1 X |

FOREIGN PATENT DOCUMENTS 2033534 5/1980 United Kingdom ................. 267/35

Primary Examiner—George E. A. Halvosa
Attorney, Agent, or Firm—William R. Hinds

[57] ABSTRACT

An engine mounting for relatively heavy engines has a lower member (2) adapted to be secured to the vehicle chassis (3), and an upper member (7) which is connected to the engine, the upper and lower members being co-operatively associated together by way of at least one rubber shear spring member (6). In order to construct such an engine mounting, without a high level of expenditure, in such a way that it is also possible to damp low-frequency, high-amplitude oscillations and to avoid damping, and the resulting transmission of noise, in respect of high-frequency, low-amplitude oscillations, a hydraulically acting springing and damping device (12) is additionally arranged between the lower member (2) and the upper member (7) of the engine mounting (1).

8 Claims, 2 Drawing Figures

ENGINE MOUNTINGS FOR TRUCKS, MOTOR COACHES OR THE LIKE UTILITY VEHICLES

FIELD OF THE INVENTION

The invention relates to an engine mounting for trucks, motor coaches or the like utility vehicles, comprising a lower member which is adapted to be secured to the vehicle chassis, and an upper member which is connected to the engine, the upper and lower members cooperating together by way of at least one shear spring member of rubber.

BACKGROUND AND SUMMARY

In known engine bearers or mountings of this kind, the lower member of the mounting, which is supported on the vehicle chassis, typically is either of a cup-shaped or a U-shaped configuration, depending on the space available for installation, while the upper member is in the form of a ball or wedge. A peripheral, annular shear spring member or at least two block-like shear spring members of rubber are arranged or vulcanised in position respectively between the lower member and the upper member. With an engine mounting of this kind, both high-frequency, low-amplitude oscillations or vibration, as will be produced by the engine when running normally, and also low-frequency, high-amplitude oscillations or vibration produced when the engine is starting up, when the engine is running at low speed, or due to the excitation effect of the roadway, are transmitted undamped from the upper member of the mounting into the shear spring member or members. The undamped low-frequency oscillations give rise to inadmissibly large movements.

Although it is known for a hydraulic shock absorber for damping the oscillations which occur, to be additionally provided between the engine and the vehicle chassis, a disadvantage is that, besides damping the low-frequency, high-amplitude oscillations which occur, the high-frequency oscillations are also damped, and this results in undesirable transmission of noise. Apart from the additional expense, it is necessary to provide a means for mounting the arrangement, and a particular form of mounting is necessary.

Single-chamber mountings with a hydraulic damping action are also known for supporting engines in passenger vehicles, such mountings producing severe damping in respect of low-frequency, high-amplitude oscillations. It would be theoretically possible for mountings designed in the above-indicated manner to be used in trucks, motor coaches or the like utility vehicles. However, the very high engine weight results in such high levels of loading on the mountings that the mountings would have to be of a size which is no longer acceptable but which in particular is no longer feasible from the structural design point of view.

The invention is therefore based on the problem of so designing an engine mounting for trucks, motor coaches or the like utility vehicles, without a high level of expenditure, so that it is also possible to damp the low-frequency, high-amplitude oscillations and to avoid damping, and the transmission of noise which results therefrom, in respect of high-frequency, low-amplitude oscillations.

To solve this problem, in an engine mounting as set forth at the beginning of this specification, the present invention proposes that a hydraulic-action springing and damping means is additionally arranged between the lower member and the upper member of the mounting. The additional hydraulic springing and damping means carries only a comparatively small proportion of the engine mounting load, but it provides effective damping in respect of low-frequency oscillations. The low level of engine mounting load makes it possible for the springing and damping means to be of a very small construction, similarly as in the case of passenger vehicles, and to be disposed in the engine mounting, preferably in the region of the upper member thereof.

The springing and damping means advantageously comprises a main body member which is supported on the lower member of the engine mounting and which is connected by way of a rubber spring to the upper member of the mounting, and a diaphragm which is clamped in the upper member of the mounting and which, in conjunction with the main body member and the rubber spring, defines a chamber which is filled with damping fluid. The chamber is in communication by way of a throttle aperture with an expansion or compensation chamber which is partially enclosed by a resilient folding bellows means and which receives without pressure a portion of the damping fluid from the fluid chamber. By virtue of this arrangement, it is possible to produce the springing and damping means, by using the upper member and the lower member of the engine mounting, that is to say, without a high level of additional expenditure.

In accordance with a preferred embodiment of the invention, the throttle aperture is disposed in the diaphragm, and the compensation or expansion chamber is provided at the side of the diaphragm which is remote from the fluid-filled chamber, and is defined by the diaphragm and the bellows means which is fitted in the upper member of the engine mounting. This has the advantage that the springing and damping means operates independently of the condition of spring stroke movement of the diaphragm, and any build-up of pressure in the chamber acts on the diaphragm on both sides.

Further details, features and advantages of the subject matter of the invention are described in greater detail hereinafter with reference to an embodiment shown in the accompanying drawing.

DESCRIPTION OF PREFERRED EMBODIMENTS

Figure 1:
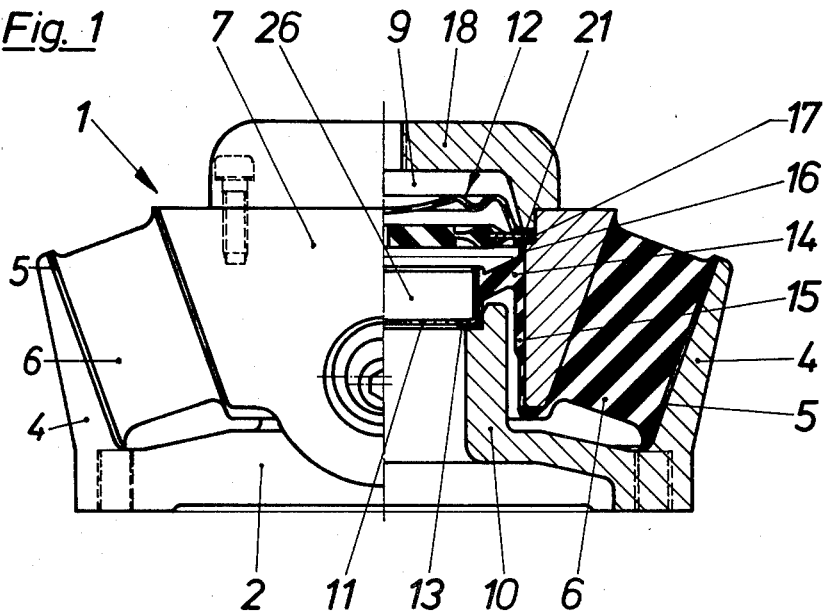
FIG. 1 shows a partly sectional front elevation of an engine mounting according to the invention.
Figure 2:
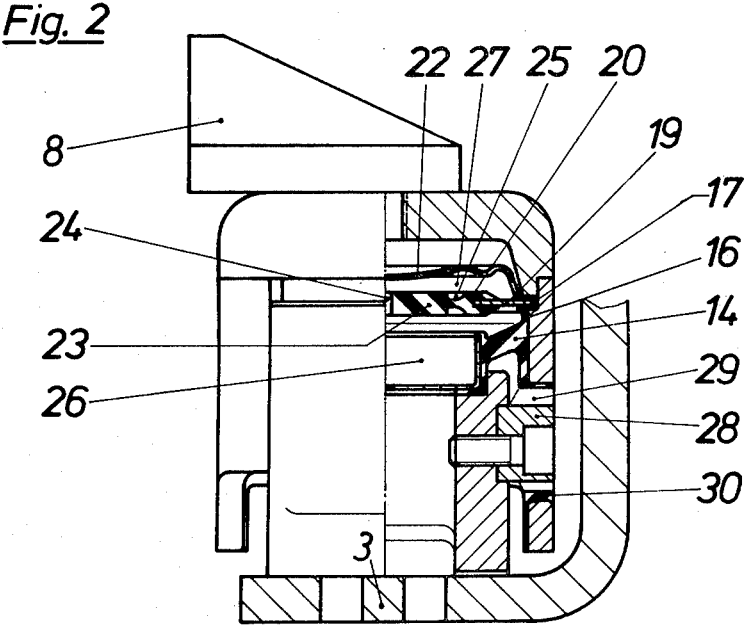
FIG. 2 shows a partly sectional side view of the FIG. 1 engine mounting.

The engine bearer or mounting 1 illustrated in the drawing, for the engine of a truck, comprises a U-shaped lower member 2 which is secured in per se known manner to a chassis member 3 which is only indicated, see FIG. 2, the lower member 2 having two limb portions 4 which are inclined outwardly. An upper member 7 of wedge configuration is supported on the two limb portions 4 of the lower member 2 by way of two block-like shear-action springs 6 which are each provided with a metal plate 5 at their contact surfaces. The lateral connecting surfaces of the upper member 7, which carry the shear-action springs 6 which are vulcanised in place, are inclined in the same manner as the limb portions 4. As can be seen from FIG. 2, the upper member 7 carries a flange 8 of an engine (not shown), and has a free internal space 9.

A collar portion 10 which is formed integrally with the lower member 2 projects into the lower region of the above-mentioned space 9. At its free end, the collar portion 10 locates and mounts a main body portion 11 of a springing and damping means generally denoted 12 which is described in greater detail hereinafter; the main body portion 11 is of a cup-like configuration and comprises sheet metal. In the locating and mounting region, the main body portion 11 is provided with a thin rubber layer 13 which was vulcanised thereto simultaneously with an annular rubber spring 14.

The main body portion 11 and therewith also the lower member 2 are connected to the upper member 7 of the engine mounting by way of the above-mentioned rubber ring 14; the rubber ring 14 is also connected to the upper member 7 by vulcanising.

A thin stepped rubber layer 15 extends on the upper member 7 from the rubber spring 14 into the region of the collar portion 10—the rubber layer 15 here forms a resilient abutment means for the collar portion 10—and extends further as far as the spring members 6. On the other hand, a thin rubber layer 16 extends into a circular recess 17 in the upper member 7, a cover member 18 which closes off the upper member 7 being fitted into the recess 17 and being secured therein in per se known manner by screw means. Clamped into the recess 17 is the sheet metal ring 19 of a diaphragm 20; in the illustrated embodiment, the ring 19 is embraced in the region in which it is clamped in position, by a U-shaped edge portion 21 of a plate-like or dish-like folding bellows means 22. The cover 18 here protects the folding bellows means 22 from damage.

The diaphragm 20 has a rubber portion 23 which is vulcanised to the ring 19 and which, in this embodiment, is provided with a central aperture 24 acting as a throttle means, while adjacent the ring 19 the rubber portion 23 is provided on both sides with an annular constriction or recess 25. The chamber 26 which is filled with damping fluid and which is defined by the main body portion 11, the rubber spring 14, the rubber layer 16 and the diaphragm 20 is in flow communication by way of the throttle aperture 24 with a compensation or expansion chamber 27 which is enclosed by the diaphragm 20 and the bellows means 22. As a result of the configuration of the bellows means 22, the compensation or expansion chamber 27 may accommodate, virtually without pressure, a part of the damping fluid in the chamber 26.

The reduction in cross-section of the rubber portion 23 or the diaphragm 20, which is produced by the recesses 25, means that that cross-section is deformed to a comparatively severe extent when subject to high-frequency, low-amplitude oscillations so that said oscillations are not damped or are only slightly damped, volume changes in chamber 26 being accommodated by deformation of the diaphragm at recesses 25, and attendant movement of part 23 of the diaphragm. When the oscillations are of low frequency and high amplitude, there is scarcely any further deformation of the rubber portion 23 or the diaphragm 20 so that, in that situation, damping fluid flows from the chamber 26 by way of the throttle aperture 24 into the chamber 27, which results in comparatively strong damping in respect of such oscillations. The point at which damping begins can be determined by design of the recesses 25. Alternatively, resilient or rigid abutments may be associated with the diaphragm on both sides thereof to control the degree of movement, and hence the point at which damping begins. The diaphragm may comprise a metal foil or film or a film-coated fabric which is provided on both sides with a resiliently deformable layer, at least in the region in which the diaphragm is clamped in position, movement of the diaphragm being governed by the deformability of the resilient layers. The cover 18 of the upper member 7 is provided with an air intake and vent opening (not shown) for the intake and relief of air. This ensures that, when the expansion chamber increases in size, a pressure cannot build up in the space below the cover 18.

As already mentioned hereinbefore, the spring members 6 are not fixedly connected to the limb portions 4 of the lower member 2. The spring members 6, with the upper member 7 and the springing and damping means 12, are pushed into the lower member 2, in a pre-stressed condition, the plate members 5 facilitating the operation of inserting the components involved. In order to produce a part of the pre-stressing when the engine mounting is relieved of load, an eccentrically adjustable abutment pin 28 is secured to the collar portion 10 of the lower member 2 and cooperates with a recess 29 in the upper member 7. In the region referred to as the abutment region, the recess 29 is lined with a layer 30 of rubber.

In a modified form of the above-described embodiment, it is possible either for the springing or damping means 12 to be arranged in the engine mounting 1 in an inverted position, or for the entire engine mounting 1 to be turned through 180°. The diaphragm 20 may be of any desired form or configuration, although it should be ensured that it has the spring characteristic required.

Having thus described my invention, including a preferred embodiment thereof, I claim:

1. An engine mounting for trucks, motor coaches or the like utility vehicles, comprising a first relatively rigid member for attachment to the vehicle frame, a second relatively rigid member for attachment to the engine, main elastomer spring means disposed relatively outwardly from the axis of the mounting and extending between said first and second members for carrying the major proportion of the engine mounting shear load, generally annularly shaped elastomer spring means located relatively radially inwardly of said main elastomer spring means and at least part of the second rigid member and extending between parts of said first and second members for carrying a comparatively small proportion of the engine mounting load, said annularly shaped elastomer spring means being connected to a main body portion of a damping means supported by said part of said first member, said annular spring means extending from said main body portion to connect with said part of said second member, a generally plate shaped folded bellows connected to and extending across said second member opposite said generally annularly shaped spring means and said main body portion such that said bellows, said main body portion and said generally annularly shaped spring means define a closed volume, an elastic separating wall extending across and carried by said second member and subdividing said closed volume into a chamber filled with damping fluid on the side facing said main body and annularly shaped spring means, and a compensating chamber on the side facing said bellows, a throttle aperture in said elastic separating wall for fluidly communicating said chambers, and said bellows being substantially unrestrained such that said compensating chamber can receive damping fluid through said throttle aperture without appreciable pressure.

2. An engine mounting as claimed in claim 1 wherein the separating wall comprises a membrane which has at least a partial area with a low inherent stiffness which increases with increasing deformation.

3. An engine mounting as claimed in claim 1 wherein at least one of said members at its surfaces adjacent to the other member is provided with an elastic layer.

4. An engine mounting as claimed in claim 1 wherein said main elastomer spring means is connected firmly with said second member and bears under prestress against a surface of said first member, but is not adherent to said surface.

5. An engine mounting as claimed in claim 4 wherein one of said members is provided with an abutment projecting into a recess of the other member to maintain said main spring means under prestress, at least one of said projecting abutment and said recess having an elastic surface portion facing the other.

6. An engine mounting as claimed in claim 4 wherein the surface of said main elastomer spring means bearing against said first member is provided with a nonelastic plate to facilitate assembly.

7. An engine mounting as claimed in claim 1 wherein said first member has spaced limb portions standing proud from a base, and a projecting collar therebetween, said second member including portions projecting into the space between the limb portions and the collar of the first member and substantially surrounding the collar of the first member, said main elastomer spring means extending between said limb portions of the first member and said projecting portions of the second member, said main body portion being seated on said collar adjacent its projecting end, said generally annularly shaped elastomer spring extending from said main body portion to connect with said projecting portions of said second member, said elastic separating wall and said bellows being disposed in said second member facing said main body portion and said generally annularly shaped elastomer spring means relatively away from said projecting collar, said second member including a cover member over but spaced from said bellows so as not to restrain free movement thereof.

8. An engine mounting as claimed in claim 7 wherein said main elastomer spring means, said generally annularly shaped spring means and said main body portion are connected with said second member, whereby said second member and its attached components can be axially assembled to said first member to prestress said main elastomer spring means and to seat said main body portion on said collar of said first member.

* * * * *